United States Patent
Chen et al.

(10) Patent No.: US 11,936,443 B2
(45) Date of Patent: Mar. 19, 2024

(54) POWER DISTRIBUTION CIRCUIT AND RADIO FREQUENCY FRONT-END TRANSCEIVING APPARATUS

(71) Applicant: SMARTER MICROELECTRONICS (GUANG ZHOU) CO., LTD., Guangzhou (CN)

(72) Inventors: Shuai Chen, Guangzhou (CN); Qiang Su, Guangzhou (CN); Jiangtao Yi, Guangzhou (CN)

(73) Assignee: SMARTER MICROELECTRONICS (GUANG ZHOU) CO., LTD., Guangzhou (CN)

( * ) Notice: Subject to any disclaimer, the term of this patent is extended or adjusted under 35 U.S.C. 154(b) by 0 days.

(21) Appl. No.: 17/929,687

(22) Filed: Sep. 3, 2022

(65) Prior Publication Data

US 2022/0416850 A1 Dec. 29, 2022

Related U.S. Application Data

(63) Continuation of application No. PCT/CN2021/134869, filed on Dec. 1, 2021.

(30) Foreign Application Priority Data

Apr. 15, 2021 (CN) .................. 202110404744.X

(51) Int. Cl.
*H04L 27/26* (2006.01)
*H04B 7/0426* (2017.01)
*H04J 11/00* (2006.01)

(52) U.S. Cl.
CPC .................. *H04B 7/0426* (2013.01)

(58) Field of Classification Search
CPC .. H04B 7/0426; H04B 1/0053; H04B 1/0458; H04B 1/18; H04B 1/40
USPC ........................................ 375/260
See application file for complete search history.

(56) References Cited

U.S. PATENT DOCUMENTS

2020/0294941 A1* 9/2020 Naito ................ H01L 23/53295

FOREIGN PATENT DOCUMENTS

| CN | 111525893 A | 8/2020 |
| CN | 111538047 A | 8/2020 |
| CN | 113300732 A | 8/2021 |

OTHER PUBLICATIONS

International Search Report in Application No. PCT/CN2021/134869, dated Feb. 16, 2022.

* cited by examiner

*Primary Examiner* — Tanmay K Shah
(74) *Attorney, Agent, or Firm* — Syncoda LLC; Feng Ma

(57) ABSTRACT

A power distribution circuit applied to a radio frequency front-end transceiving apparatus includes a common-stage amplifying circuit and a branch-stage amplifying circuit, in which the branch-stage amplifying circuit comprises at least two parallel channel amplifying circuits; the common-stage amplifying circuit is configured to perform a first signal processing on a radio frequency signal received by an antenna of the radio frequency front-end transceiving apparatus to obtain a first power signal and output the first power signal to each of channel amplifying circuits, in which the first signal processing at least includes a buffering processing, an isolation processing and a low-noise amplifying processing; each channel amplifying circuit is configured to perform a second signal processing on the first power signal to obtain a second power signal and output the second power signal to a radio transceiving device; the second signal processing at least includes a low-noise amplifying processing.

9 Claims, 7 Drawing Sheets

POWER DISTRIBUTION CIRCUIT AND RADIO FREQUENCY FRONT-END TRANSCEIVING APPARATUS

CROSS-REFERENCE TO RELATED APPLICATIONS

This is a continuation of International Application No. PCT/CN2021/134869 filled on Dec. 1, 2021, which claims priority to Chinese Patent Application No. 202110404744.X filled on Apr. 15, 2021. The disclosures of the above-referenced applications are hereby incorporated by reference in their entirety.

BACKGROUND

In some implementations, the power distribution of single input-multiple output is realized by adding a power splitter before at least two parallel-channel low-noise amplifiers.

SUMMARY

The present disclosure relates to the radio frequency circuit techniques, particularly to a power distribution circuit and a radio frequency front-end transceiving apparatus.

Embodiments of the disclosure intend to provide the power distribution circuit and a radio frequency front-end transceiving apparatus.

In an aspect, some embodiments of the disclosure provide a power distribution circuit which is applied to the radio frequency front-end transceiving apparatus and includes a common-stage amplifying circuit and a branch-stage amplifying circuit, in which the branch-stage amplifying circuit at least includes two parallel channel amplifying circuits; and the common-stage amplifying circuit is configured to perform a first signal processing on a radio frequency signal received by an antenna of the radio frequency front-end transceiving apparatus to obtain a first power signal and output the first power signal to each of the channel amplifying circuits, in which the first signal processing at least includes a buffering processing, an isolation processing and a low-noise amplifying processing; each of the channel amplifying circuits is configure to perform a second signal processing on the first power signal to obtain a second power signal and output the second power signal to a radio transceiving device of the radio frequency front-end transceiving apparatus, and the second signal processing at least includes a low-noise amplifying processing.

In another aspect, some embodiments of the disclosure also provide the radio frequency front-end transceiving apparatus including the power distribution circuit.

It should be understood that both the foregoing general description and the following detailed description are exemplary and explanatory and are not restrictive of the disclosure.

BRIEF DESCRIPTION OF THE DRAWINGS

The accompanying drawings, which are incorporated in and constitute a part of this specification, illustrate embodiments consistent with the disclosure, and together with the description, serve to describe the technical solutions of the disclosure.

DETAILED DESCRIPTION

The disclosure is described in further detail below with reference to the drawings and embodiments. It is to be understood that the embodiments provided herein are only used to explain the disclosure but not to limit the disclosure. In addition, the embodiments provided below are part of, rather than all, embodiments for implementing the invention. The technical solutions described in the embodiments of the disclosure can be implemented in any combinations, as long as no conflict.

It should be noted that in the embodiments of the disclosure, the terms "include/including", "comprise/comprising" or any other variation thereof, intend to cover a non-exclusive inclusion, such that a circuit including a series of elements includes not only the explicitly recorded elements, but also other element(s) that is not recorded, or that is inherent to the circuit. Without further limitation, the definition of an element by "(a circuit) includes/comprises an element" does not exclude the presence of an additional related element in the circuit.

The term "and/or" as used herein is merely an association relationship that describes associated objects, indicating that there may be three relationships. For example, U and/or W, means three situations that U exists only, U and W exist simultaneously, and W exists only. In addition, the term "at least one" as used herein refers to any one of a plurality, or any combinations of at least two of the plurality. For example, including at least one of U, W and V means including any one or more elements selected from the group consisting of U, W and V.

The introduction of the power splitter deteriorates the noise coefficient at an output end. Therefore, a low-noise amplifier can be added at the front-end of the splitter to increase the channel gain and reduce the noise coefficient at the output end of the channel, which, however, would cause the radio frequency front-end transceiving apparatus to occupy a large area.

Carrier aggregation (CA) is introduced to increase transmission bandwidth in 4G communication. In addition to CA, there are EUTRA-NR dual connection (EN-DC) mode and a multiple input-multiple output (MIMO) mode in 5G communication. All the three modes require at least two channels to receive and transmit signals simultaneously.

Figure 1:
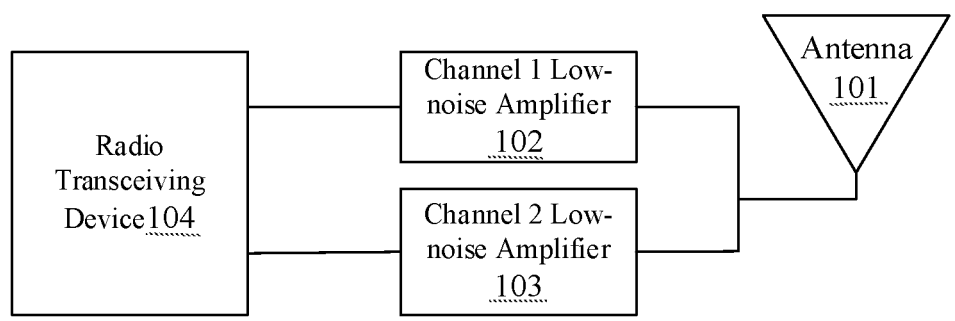
FIG. 1 is a schematic diagram of the structure of a radio frequency front-end transceiving apparatus in some implementations.

For the case where there is only one receive (RX) channel antenna, that is, two frequency bands share one input port and one antenna, the structure of such radio frequency front-end transceiving apparatus is shown in FIG. 1. As shown in FIG. 1, the antenna 101 is configured to receive a radio frequency signal and output the received radio frequency signal to channel 1 low-noise amplifier 102 and channel 2 low-noise amplifier 103, in which the channel 1 low-noise amplifier 102 and the channel 2 low-noise amplifier 103 are configured to perform the low-noise amplifying processing on the radio frequency signal received by the antenna 101 and output the low-noise amplifying processed power signal to the radio transceiving device 104. Since the radio frequency signal received by the antenna 101 is directly output to the channel 1 low-noise amplifier 102 and the channel 2 low-noise amplifier 103 without an isolation processing, a buffering processing, or the like, the effect of the power signal obtained at the output end of the channel is poor.

Figure 2:
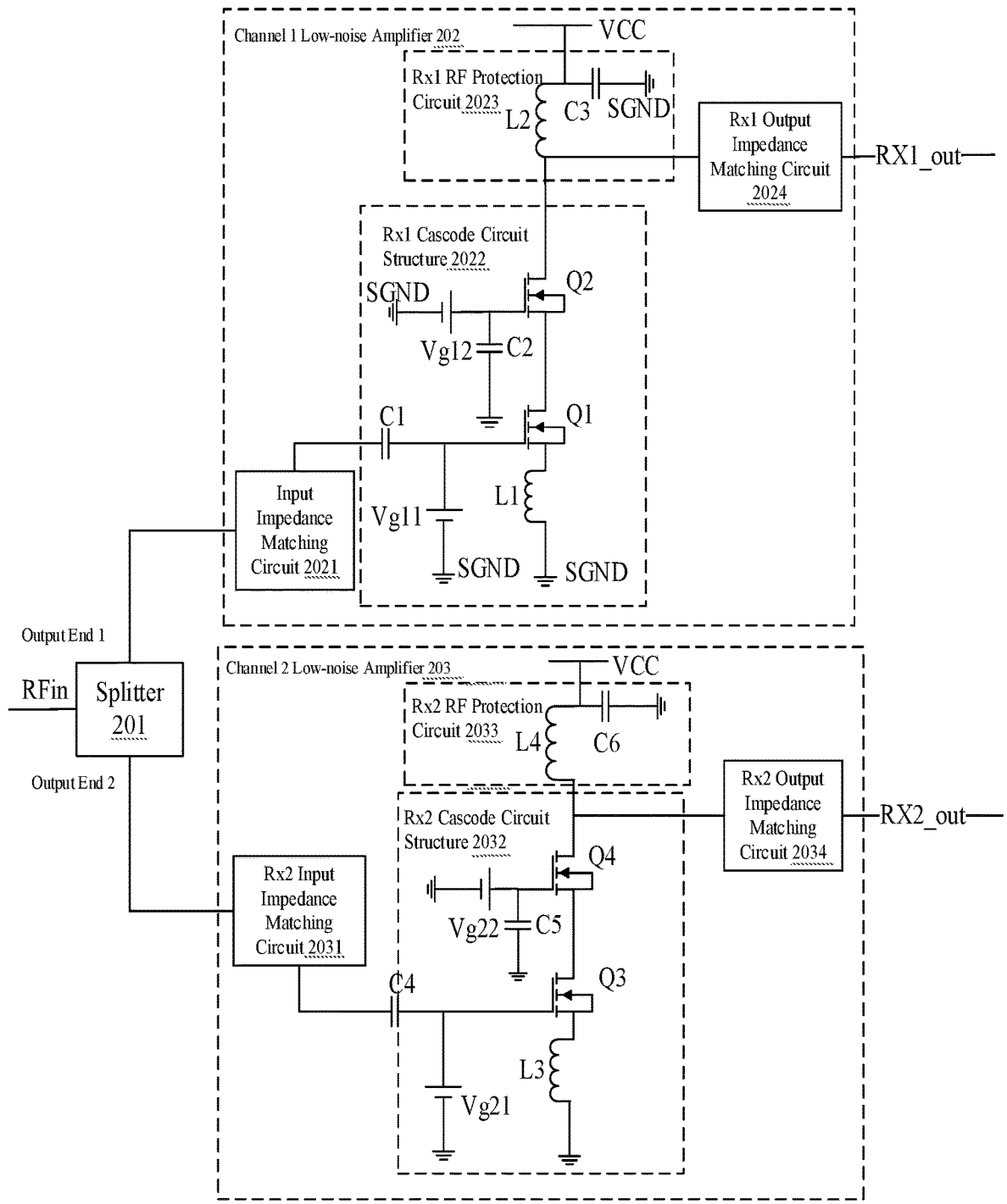
FIG. 2 is a schematic diagram of the structure of a one-to-two power distribution circuit in some implementations, in which a single input-dual output is realized by a power splitter.

In some implementations, the main method to realize the single input-dual output one-to-two distribution is the power splitter (hereinafter also referred to as splitter). In the method, the splitter is added between the antenna and the channel low-noise amplifying circuits of the radio frequency front-end transceiving apparatus. Referring to FIG. 2, radio frequency signal RFin received from the antenna is connected to the input end of the splitter 201, and the output end 1 of the splitter 201 is connected to the channel 1 low-noise amplifier 202; and output end 2 of the splitter 201 is connected to the channel 2 low-noise amplifier 203. The output of the channel 1 low-noise amplifier 202 is the channel 1 radio frequency power output signal RX1 out; and the output of the channel 2 low-noise amplifier 203 is the channel 2 radio frequency power output signal RX2 out.

It can be understood that the structures of the circuits of the channel 1 low-noise amplifier 202 and the channel 2 low-noise amplifier 203 are the same, including an input impedance matching circuit, a cascode circuit structure, a radio frequency protection circuit and an output impedance matching circuit, respectively. The channel 1 low-noise amplifier 202 includes RX1 input impedance matching circuit 2021, RX1 cascode circuit structure 2022, RX1 radio frequency protection circuit 2023 and RX1 output impedance matching circuit 2024. The channel 2 low-noise amplifier 203 includes RX2 input impedance matching circuit 2031, RX2 cascode circuit structure 2032, RX2 radio frequency protection circuit 2033 and RX2 output impedance matching circuit 2034.

Here, one end of the RX1 input impedance matching circuit 2021 is connected to the output end 1 of the splitter, and another end of the RX1 input impedance matching circuit 2021 is connected to the input end of the RX1 cascode circuit structure 2022, and the output end of the RX1 cascode circuit structure 2022 is connected to the input end of the RX1 output impedance matching circuit 2024, the output end of the RX1 output impedance matching circuit 2024 is the channel 1 radio frequency power output signal RX1 out, and the RX1 radio frequency protection circuit 2023 is connected between the output end and the direct current power supply of the RX1 cascode circuit structure 2022.

In FIG. 2, the RX1 cascode circuit structure 2022 includes a first capacitor C1 and a second capacitor C2, a first transistor Q1, a second transistor Q2, a first inductor L1, a first bias voltage Vg11, a second bias voltage Vg12, a direct current power supply positive terminal VCC and a ground terminal SGND; and the RX1 radio frequency protection circuit 2023 includes a third capacitor C3 and a second inductor 12.

C1 is connected between the output end of the input impedance matching circuit 2021 and the positive electrode of Vg11, and the negative electrode of the Vg11 is connected to SGND, and performs an anti-interference processing on the radio frequency signal passing through the input impedance matching circuit 2021. Vg11 provides a bias voltage to Q1. The gate of Q1 is connected to the common node of C1 and Vg11, and the source of Q1 is connected to SGND through the series connected L1 for maintaining the stability of the circuit. The drain of Q1 is connected to the source of Q2, and the gate of Q2 is connected to the common node of C2 and Vg12. The positive electrode of Vg12 is connected to one end of C2, and another end of C2 is connected to SGND, and the negative electrode of the Vg12 is connected to SGND. The drain of Q2 is connected to VCC through the series connected L2 to prevent the radio frequency signal from channeling into the circuit. C3 is transboundary between VCC and SGND for removing the radio frequency interference on VCC. The drain of Q2 serves as the output end of the RX1 cascode circuit structure 2022.

The drain of Q2 is connected to the input end of the RX1 output impedance matching circuit 2024, and the output end of the RX1 output impedance matching circuit 2024 serves as the channel 1 radio frequency power output signal RX1 out.

Since the structure of the circuit of the channel 1 low-noise amplifier 202 are same as those of the circuit the channel 2 low-noise amplifier 203, the detailed description of the latter is omitted herein.

It can be understood that the active loss of the splitter degrades the noise factor at the output end of the channel. If the active loss of the splitter was L, the noise factor deteriorates by L times, by referring to equation (1), $$F_{out\_RX1/RX2} = L * F_{RX1/RX2} * 2 \qquad (1);$$

in which $F_{RX1/RX2}$ represents the noise factor of RX1 channel or RX2 channel, and the $F_{out\_RX1/RX}$ represents the noise factor at the output end of RX1 or RX2.

The noise factor at the output end of RX1 is obtained by multiplying the number of equal division of the splitter, i.e. 2, with the active loss L of the splitter, and then with the noise factor of the RX1 channel. Similarly, the noise factor at the output end of RX2 is obtained by multiplying the number of equal division of the splitter, i.e. 2, with the active loss L of the splitter, and then with the noise factor of the RX2 channel.

It can be seen from the equation (1) that the introduction of the splitter increases the noise factor at the output end of RX1 or that of RX2, i.e., the noise factors at the output ends of the channels.

Figure 3:
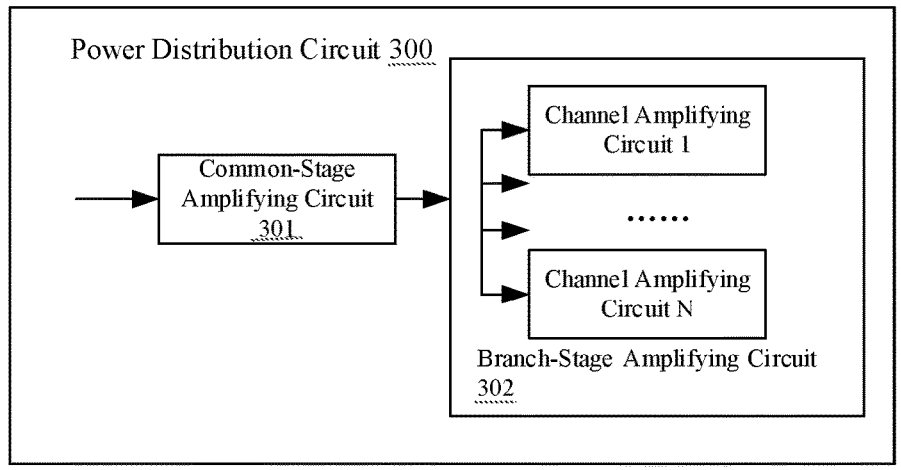
FIG. 3 is a schematic diagram of the structure of a power distribution circuit provided by some embodiments of the disclosure.

Some embodiments of the disclosure provide a power distribution circuit. Referring to FIG. 3, the power distribution circuit 300 is applied to the radio frequency front-end transceiving apparatus, and includes a common-stage amplifying circuit 301 and a branch-stage amplifying circuit 302, in which the branch-stage amplifying circuit 302 at least includes two parallel channel amplifying circuits.

The common-stage amplifying circuit 301 is configured to perform a first signal processing on a radio frequency signal received by an antenna of the radio frequency front-end transceiving apparatus to obtain a first power signal, and output the first power signal to each of the channel amplifying circuits, respectively. The first signal processing at least includes a buffering processing, a isolation processing and a low-noise amplifying processing.

Each of the channel amplifying circuits is configured to perform a second signal processing on the first power signal to obtain a second power signal and output the second power signal to a radio transceiving device of the radio frequency front-end transceiving apparatus. The second signal processing at least includes the low-noise amplifying processing.

It can be understood that the radio frequency front-end transceiving apparatus may include the transceiving antenna, at least two of the transceiving channels and the radio transceiving device.

In one example, the common-stage amplifying circuit 301 may be a low-noise amplifier (LNA), and the channel amplifying circuits may also be a LNAs, i.e. the branch-stage amplifying circuit 302 may also at least include two parallel LNAs.

In some possible embodiments, the amplification times of the low-noise amplifying processing in the first signal processing is not limited, and in actual applications, the amplification times may be determined according to specific design requirements.

It can be understood that each of the channel amplifying circuits in the branch-stage amplifying circuit 302 may be equivalent to a parallel load of the common-stage amplifying circuit 301, that is, the output power of the common-stage amplifying circuit 301 is distributed to each of the channel amplifying circuits, and achieves one-to-many equal power distribution, when the input impedances of the amplifying circuits are the same.

In some possible embodiments, in the case that the value of the input impedance of each of the channel amplifying circuits is the same, each of the channel amplifying circuits outputs the same power value.

In the embodiment of the disclosure, by providing the common-stage amplifying circuit, which is capable of carrying out the buffering processing, the isolation processing and the low-noise amplifying processing on the radio frequency signal received by the antenna of the radio frequency front-end transceiving apparatus, the power distribution of single input-multiple output can be realized, and thus the noise coefficient at the output end can be reduced without a power splitter, and meanwhile the area occupied by the radio frequency front-end transceiving apparatus is reduced.

Figure 4:
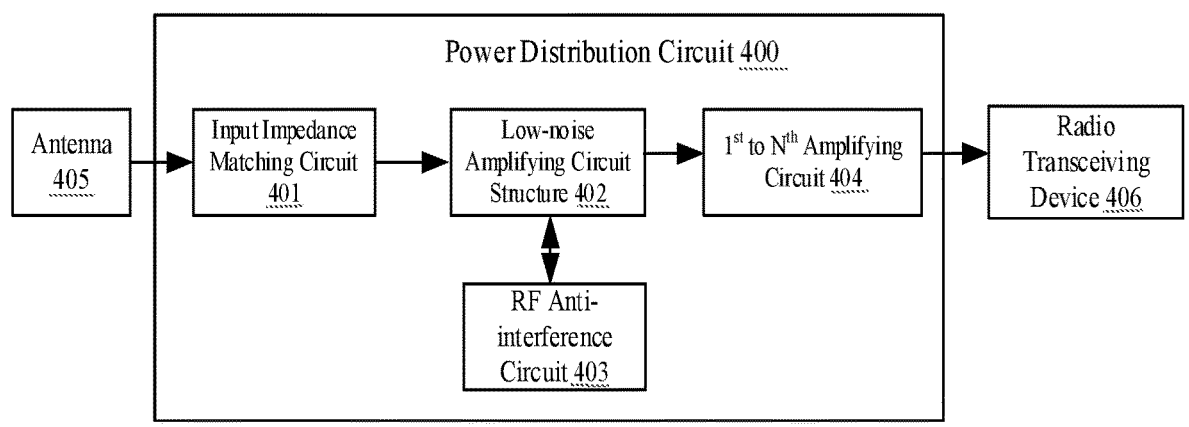
FIG. 4 is a schematic diagram of the structure of another power distribution circuit provided by some embodiments of the disclosure.

FIG. 4 is the schematic diagram of the structure of another power distribution circuit according to some embodiments of the disclosure. As shown in FIG. 4, the power distribution circuit 400 is applied to the radio frequency front-end transceiving apparatus, and includes an input impedance matching circuit 401, a low-noise amplifying circuit structure 402, a radio frequency anti-interference circuit 403, and a first to N-th amplifying circuit 404, in which N is an integer greater than 2.

The input impedance matching circuit 401 is configured to perform an input impedance matching processing on the radio frequency signal received by an antenna 405 of the radio frequency front-end transceiving apparatus to obtain a radio frequency signal processed by the input impedance matching processing, and output the radio frequency signal processed by the input impedance matching processing to the low-noise amplifying circuit structure 402.

The low-noise circuit amplifying structure 402 is configured to perform the first signal processing on the radio frequency signal processed by the input impedance matching processing to obtain the first power signal, and output the first power signal to each of the channel amplifying circuits, respectively. The first signal processing at least includes the buffering processing, the isolation processing and the low-noise amplifying processing.

The radio frequency anti-interference circuit 403 is connected between the output end of the low-noise amplifying circuit structure and the direct current power supply of the low-noise amplifying circuit structure for preventing the radio frequency signal from channeling into the direct current power supply, and realizing the protection of the common-stage amplifying circuit from being interfered by the radio frequency.

The first to N-th amplifying circuit 404 is configured to perform the second signal processing on the first power signal to obtain the second power signal, and output the second power signal to a radio transceiving device 406 of the radio frequency front-end transceiving apparatus. The second signal processing at least includes the low-noise amplifying processing.

In one possible embodiment, the low-noise amplifying circuit structure is one of the common source circuit structure and the cascode circuit structure. Here, any of the common source circuit structure and the cascode circuit structure may be a circuit for realizing low-noise amplification of specific times for improving the bandwidth gain, the stability and the input impedance. Transistors in the common source circuit structure and the cascode circuit structure may be any of a metal-oxide-semiconductor (CMOS), a bipolar junction transistor (BJT) and a field effect transistor (FET).

In one embodiment, the input impedance matching circuit 401 may be designed based on the bandwidth of the input radio frequency signal so that the circuit can operate at the maximum output power state.

In the embodiment of the disclosure, with the input impedance matching circuit, the low-noise amplifying circuit structure and the radio frequency anti-interference circuit, the radio frequency signal received by the antenna of the radio frequency front-end transceiving apparatus is processed by the buffering processing, the isolation processing and the low-noise amplifying processing to obtain the first power signal. Therefore, the obtained first power signal is the processed signal by the buffering processing, the isolation processing and the low-noise amplifying processing; and an output power signal with a smaller noise factor can be obtained by each of the channel amplifying circuits performing the second processing on the first power signal.

Figure 5:
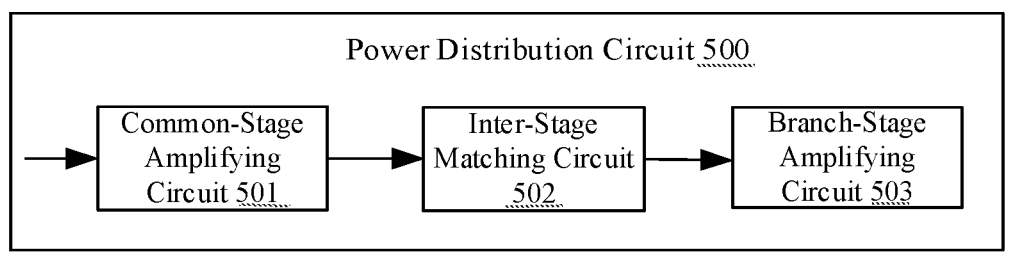
FIG. 5 is a schematic diagram of the structure of yet another power distribution circuit provided by some embodiments of the disclosure.

FIG. 5 is a schematic diagram of the structure of another power distribution circuit according to some embodiments of the disclosure. As shown in FIG. 5, the power distribution circuit 500 is applied to the radio frequency front-end transceiving apparatus, and includes a common-stage amplifying circuit 501, an inter-stage matching circuit 502 and a branch-stage amplifying circuit 503. Herein, the branch-stage amplifying circuit 503 at least includes two parallel channel amplifying circuits.

The common-stage amplifying circuit 501 is configured to perform the first signal processing on the radio frequency signal received by the antenna of the radio frequency front-end transceiving apparatus to obtain the first power signal, and output the first power signal to each of the channel amplifying circuits. The first signal processing at least includes the buffering processing, the isolation processing and the low-noise amplifying processing;

The inter-stage matching circuit 502 is configured to perform the impedance matching between the common-stage amplifying circuit and each of the channel amplifying circuits.

Each of the channel amplifying circuits is configured to perform the second signal processing on the first power signal to obtain the second power signal and output the second power signal to the radio transceiving device of the radio frequency front-end transceiving apparatus. The second signal processing at least includes the low-noise amplifying processing.

In the embodiment of the present disclosure, the inter-stage matching circuit connected between the common-stage amplifying circuit and each of the channel amplifying circuits may be a circuit including a capacitor. In one example, the inter-stage matching circuit may be a capacitor with a set specific parameter, which may be the capacitor for performing a DC blocking processing, but also has an impedance matching effect.

Figure 6:
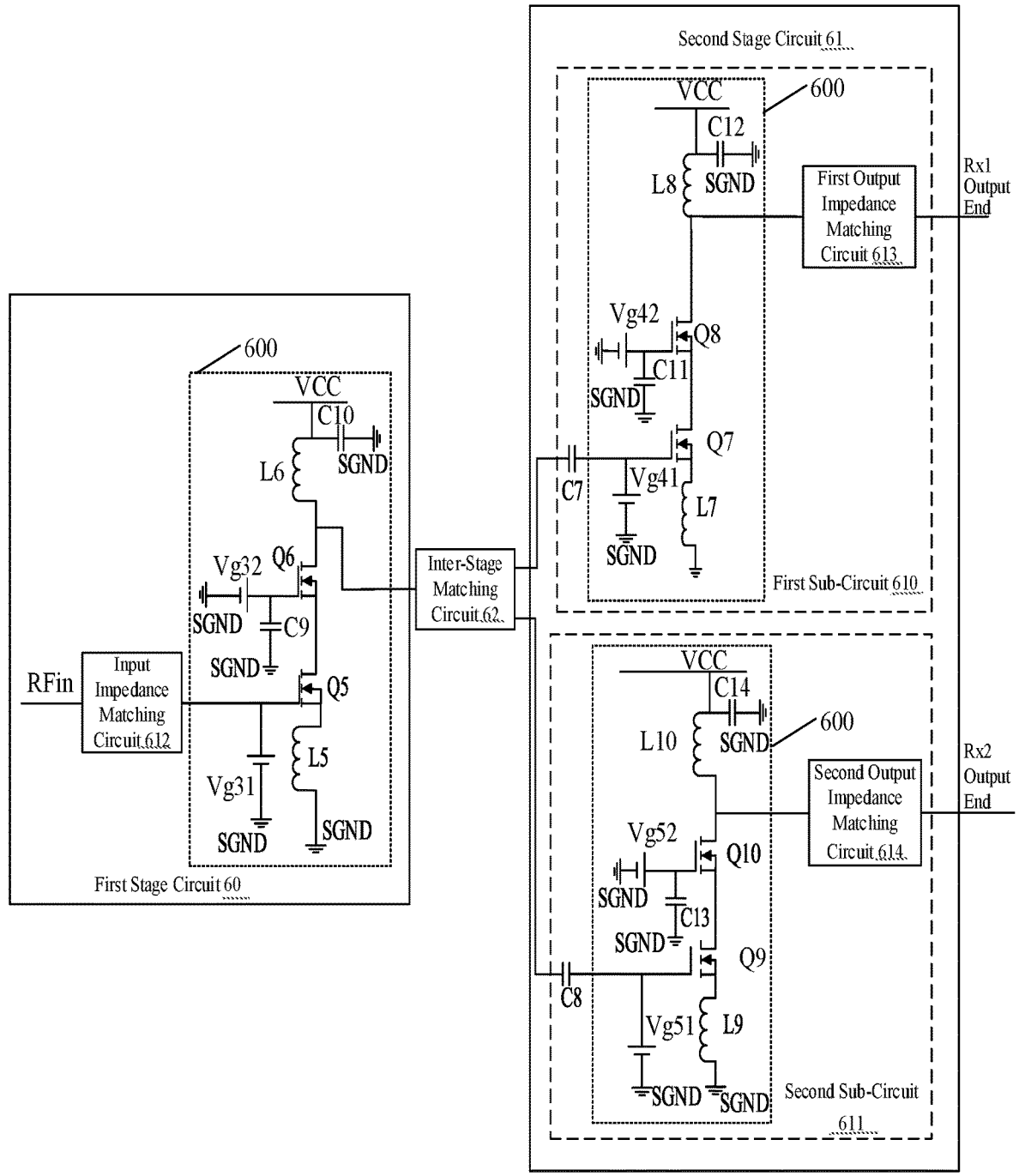
FIG. 6 is a schematic diagram of the structure of a one-to-two power distribution circuit provided by some embodiments of the disclosure.

On the basis of the above-mentioned embodiments, some embodiments of the present disclosure provide a schematic diagram of the structure of a one-to-two power distribution circuit. As shown in FIG. 6, the power distribution circuit includes first stage circuit 60, second stage circuit 61 and inter-stage matching circuit 62. The second stage circuit 61 includes first sub-circuit 610 and second sub-circuit 611. The output end of the first stage circuit 60 is connected to an input end of the inter-stage matching circuit 62, and the output ends of the inter-stage matching circuit 62 are connected to the input ends of the first sub-circuit 610 and the second sub-circuit 611, respectively, and the output ends of the first sub-circuit 610 and the second sub-circuit 611 are RX1 output end and RX2 output end, respectively. The RX1 and RX2 represent channel 1 and channel 2, respectively.

In the embodiment of the present disclosure, the first stage circuit 60 is the common stage circuit, and the output end of the first stage circuit 60 is directly connected to the second stage circuit 61 (the inter-stage matching circuit can be omitted), that is, the first sub-circuit 610 and the second sub-circuit 611 are simultaneously mounted on the output end of the first stage circuit 60. Since the first sub-circuit 610 and the second sub-circuit 611 are equivalent to the load of the first-stage circuit 60 at the output end thereof, and the first sub-circuit 610 and the second sub-circuit 611 are connected in parallel, the output power of the first-stage circuit 60 is equally divided by the first sub-circuit 610 and the second sub-circuit 611. Thus, the process of splitting one signal into two can be realized without using a splitter.

In FIG. 6, since the compositions and structures of the first stage circuit 60, the first sub-circuit 610, and the second sub-circuit 611 are similar, all including an integrated amplifying circuit 600 consisting of a cascode structure and a radio frequency anti-interference resistor with the difference that the first stage circuit 60 further includes an input impedance matching circuit 612, the first sub-circuit 610 further includes a first output impedance matching circuit 613 and a seventh capacitor C7, and the second sub-circuit further includes a second output impedance matching circuit 614 and an eighth capacitor C8.

It can be seen that in the first stage circuit 60, the output end of the input impedance matching circuit 612 is connected to the input end of the integrated amplifying circuit 600, and the output end of the integrated amplifying circuit 600 is the output end of the first stage circuit 60. In the first sub-circuit 610, C7 is connected between the output end of the inter-stage matching circuit 62 and the input end of the integrated amplifying circuit 600, and the output end of the integrated amplifying circuit 600 is connected to the input end of the first output impedance matching circuit 613, and the output end of the first output impedance matching circuit 613 is used as the RX1 output end. In the second sub-circuit 611, C8 is connected between the output end of the inter-stage matching circuit 62 and the input end of the integrated amplifying circuit 600, and the output end of the integrated amplifying circuit 600 is connected to the input end of the second output impedance matching circuit 613, and the output end of the second output impedance matching circuit 614 is used as the RX2 output end.

The integrated amplifying circuit 600 in the first stage circuit 60 includes a ninth capacitor C9 and a tenth capacitor C10, a fifth transistor Q5, a sixth transistor Q6, a fifth inductor L5, a sixth inductor L6, a fifth bias voltage Vg31, a sixth bias voltage Vg32, a direct current power supply positive terminal VCC, and a ground terminal SGND.

The output end of the input impedance matching circuit 612 is connected to the positive electrode of Vg31, and the negative electrode of Vg31 is connected to SGND. The gate of Q5 is connected to a common node of Vg31 and the input impedance matching circuit 612, and Vg31 is used for providing a bias voltage to Q5. The source of Q5 is connected to SGND through connecting L5 in series for keeping the stability of the circuit. The drain of Q5 is connected to the source of Q6, and the gate of Q6 is connected to a common node of C9 and Vg32. The positive electrode of Vg32 is connected to one end of C9, the other end of C9 is connected to SGND, and the negative electrode of Vg32 is connected to SGND. The drain of Q6 is connected to VCC through connecting L6 in series to prevent the radio frequency signal from channeling into the circuit. C10 is transboundary between VCC and SGND for removing the radio frequency interference on VCC. The drain of Q6 serves as the output end of the integrated amplifying circuit 600 in the first stage circuit 60.

The integrated amplifying circuit 600 in the first sub-circuit 610 includes an eleventh capacitor C11 and a twelfth capacitor C12, a seventh transistor Q7, an eighth transistor Q8, a seventh inductor L7, an eighth inductor L8, a seventh bias voltage Vg41, an eighth bias voltage Vg42, a direct current power supply positive terminal VCC, and a ground terminal SGND.

The positive electrode of Vg41 is connected to one end of C7, and the negative electrode of Vg41 is connected to SGND. The gate stage of Q7 is connected to a common node of Vg41 and C7, and Vg41 is used for supplying a bias voltage to Q7. The source stage of Q7 is connected to SGND through cascading L7 for keeping the circuit stable. The drain of Q7 is connected to the source of Q8, and the gate of Q8 is connected to a common node of C11 and Vg42. The positive electrode of Vg42 is connected to one end of C11, the other end of C11 is connected to SGND, and the negative electrode of Vg42 is connected to SGND. The drain of Q8 is connected to VCC through cascading L8 to prevent the radio frequency signal from channeling into the circuit. C12 is transboundary between VCC and SGND for removing the radio frequency interference on VCC. The drain of Q8 serves as the output end of the integrated amplifying circuit 600 in the first sub-circuit 610.

The integrated amplifying circuit 600 in the second sub-circuit 611 includes a thirteenth capacitor C13 and a fourteenth capacitor C14, a ninth transistor Q9, a tenth transistor Q10, a ninth inductor L9, a tenth inductor L10, a ninth bias voltage Vg51, a tenth bias voltage Vg52, a direct current power supply positive terminal VCC, and a ground terminal SGND.

The positive electrode of Vg51 is connected to one end of C8, and the negative electrode of Vg51 is connected to SGND. The gate stage of the Q9 is connected to a common node of Vg51 and C8, and Vg51 is used for supplying the bias voltage to Q9. The source stage of Q9 is connected to SGND by cascading L9 for maintaining the stability of the circuit. The drain of Q9 is connected to the source of Q10, and the gate of Q10 is connected to a common node of C13 and Vg52. The positive electrode of Vg52 is connected to one end of C13, the other end of C13 is connected to SGND, and the negative electrode of Vg52 is connected to SGND. The drain of Q10 is connected to VCC through connecting L10 in series to prevent the radio frequency signal from channeling into the circuit. C14 is transboundary between VCC and SGND for removing the radio frequency interference on VCC. The drain of Q10 serves as the output end of the integrated amplifying circuit 600 in the second sub-circuit 611.

It can be understood that when one of the RX1 channel corresponding to the first sub-circuit 610 and the RX2 channel corresponding to the second sub-circuit 611 words alone, the other channel is in a closed state, that is, the output impedance of the other channel represents a high impedance, which is equivalent to an open circuit which does not affect the circuit in the operating state.

Figure 7:
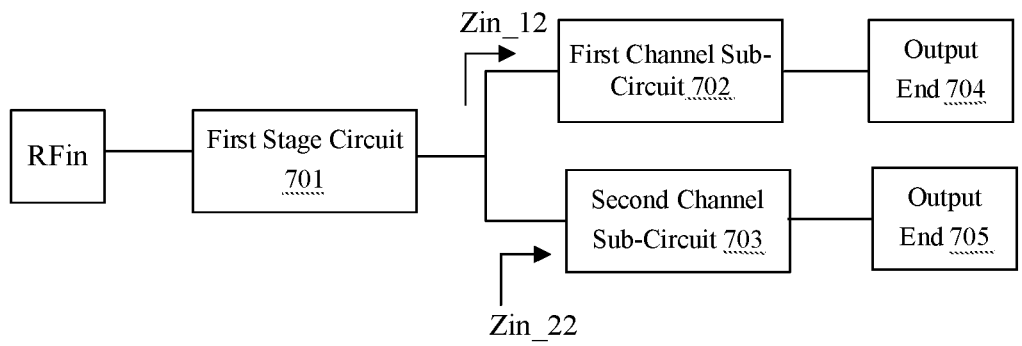
FIG. 7 is a block diagram of the constitution of a one-to-two power distribution circuit provided by some embodiments of the disclosure.

FIG. 7 is a block diagram showing the constitution of a one-to-two power distribution circuit according to some embodiments of the disclosure. As shown in FIG. 7, the power distribution circuit includes a radio frequency signal RFin from the antenna, a first stage circuit 701, a first channel sub-circuit 702, a second channel sub-circuit 703, the output end 704 of the first channel sub-circuit 702, and the output end 705 of the second channel sub-circuit 703. Zin_12 represents an equivalent input impedance of the first channel sub-circuit 702. Zin_22 represents an equivalent input impedance of the second channel sub-circuit 703.

Figure 8:
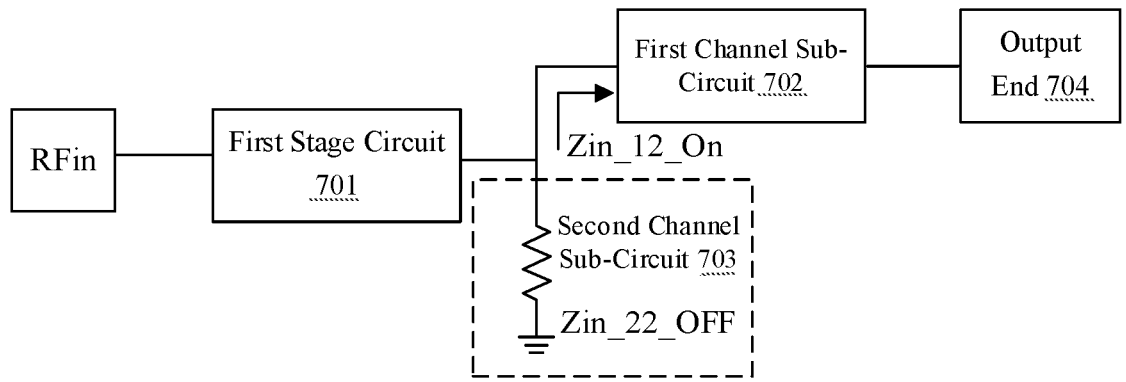
FIG. 8 is a schematic diagram of the structure of an equivalent circuit corresponding to a one-to-two power distribution circuit provided by some embodiments of the disclosure.

Based on FIG. 7, when the first channel sub-circuit 702 is in the operating state and the second channel sub-circuit 703 is in the off state, the second channel sub-circuit 703 is equivalent to an open circuit, since the equivalent input impedance Zin_22 of the second channel sub-circuit 703 is in high resistance. As shown in FIG. 8, the dotted line frame shows the equivalent impedance Zin_22_OFF of the second channel sub-circuit 703 in the off state, and it can be seen that the Zin_22_OFF is much greater than the equivalent impedance Zin_12_On of the first sub-circuit in the operating state.

Figure 9:
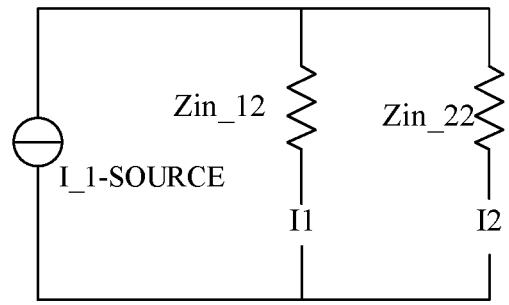
FIG. 9 is a schematic diagram of the structure of an equivalent circuit corresponding to another one-to-two power distribution circuit provided by some embodiments of the disclosure.

FIG. 9 is a schematic diagram of the structure of an equivalent circuit corresponding to another one-to-two power distribution circuit according to some embodiments of the disclosure. As shown in FIG. 9, the first-stage circuit 60 is equivalent to current source I_1-SOURCE, and Zin_12 and Zin_22 are input impedances of RX1 channel and RX2 channel, respectively. Since Zin_12=Zin_22, so I1=I2, I1$^2$*Zin_12=I2$^2$*Zin_22.

Figure 10:
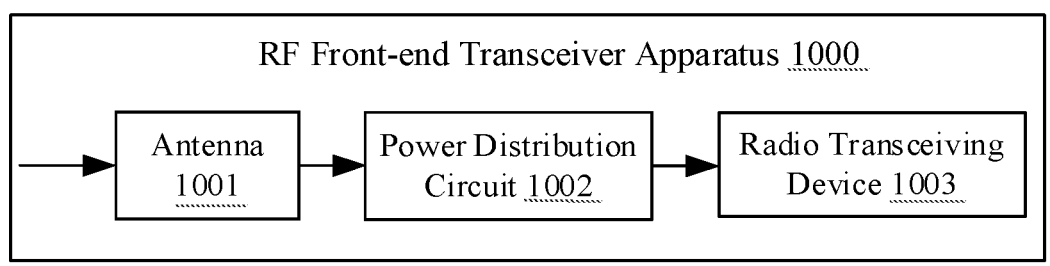
FIG. 10 is a schematic diagram of the structure of a radio frequency front-end transceiving apparatus provided by some embodiments of the disclosure.

FIG. 10 is a schematic diagram of the structure of a radio frequency front-end transceiver apparatus provided in some embodiments of the present disclosure. As shown in FIG. 10, the radio frequency front-end transceiver apparatus 1000 includes an antenna 1001, a power distribution circuit 1002 connected to the antenna 1001, and a radio transceiving device 1003 is wired to the power distribution circuit 1002.

Here, the antenna 1001 is configured for receiving or transmitting a radio frequency signal, and transmitting the radio frequency signal to the power distribution circuit 1002, with which the radio frequency signal is subjected to one to many power distribution and amplification to obtain multiple power signals which are transmitted to the radio transceiving device 1003.

The above description of the embodiments tends to emphasize differences between the various embodiments, and the same or similar aspects of the embodiments can be referred to each other, and are not repeated herein for the sake of brevity.

The features disclosed in the examples of the circuits provided herein can be arbitrarily combined, as long as there is no conflict, to yield new examples of circuits.

Various embodiments of the present disclosure can have one or more of the following advantages.

The single input-multiple output power distribution is achieved by setting the common-stage amplifying circuit, which is capable of performing the buffering processing, the isolation processing and the low-noise amplifying processing on the radio frequency signal received by the antenna of the radio frequency front-end transceiving apparatus, at front-end of each of the channel amplifying circuits, and therefore the noise coefficient at the output end can be reduced even without the power splitter, and meanwhile, the area occupied by the radio frequency front-end transceiving apparatus is reduced.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A power distribution circuit, which is applied to a radio frequency front-end transceiving apparatus, comprising: a common-stage amplifying circuit and a branch-stage amplifying circuit, wherein the branch-stage amplifying circuit comprises at least two parallel channel amplifying circuits;
    the common-stage amplifying circuit is configured to perform a first signal processing on a radio frequency signal received by an antenna of the radio frequency front-end transceiving apparatus to obtain a first power signal, and output the first power signal to each of the channel amplifying circuits, respectively, wherein, the first signal processing at least includes a buffering processing, an isolation processing and a low-noise amplifying processing;
    each of channel amplifying circuits is configured to perform a second signal processing on the first power signal to obtain a second power signal, and output the second power signal to a radio transceiving device of the radio frequency front-end transceiving apparatus; and
    the second signal processing at least includes a low-noise amplifying processing;
    the power distribution circuit further comprising an inter-stage matching circuit, which is connected between the common-stage amplifying circuit and each of the channel amplifying circuits, is configured to perform an impedance matching on the common-stage amplifying circuit and each of the channel amplifying circuits.

2. The power distribution circuit according to claim 1, wherein the common-stage amplifying circuit comprises a low-noise amplifying circuit structure, which is configured to perform the first signal processing on the radio frequency signal received by the antenna of the radio frequency front-end transceiving apparatus to obtain the first power signal, and output the first power signal to each of the channel amplifying circuits.

3. The power distribution circuit according to claim 2, wherein the low-noise amplifying circuit structure is one of a common source circuit structure and a cascode circuit structure.

4. The power distribution circuit according to claim 1, wherein the common-stage amplifying circuit is a low-noise amplifier.

5. The power distribution circuit according to claim 1, wherein, under a condition that a value of an input impedance of each of the channel amplifying circuits is the same, an output power value of each of the channel amplifying circuits is the same.

6. A radio frequency front-end transceiving apparatus, comprising the power distribution circuit according to claim 1.

7. The radio frequency front-end transceiving apparatus according to claim 6, further comprising an antenna, wherein a single input-multiple output power distribution is realized by setting the common-stage amplifying circuit configured to perform the buffering processing, the isolation processing and the low-noise amplifying processing on radio frequency signals received by the antenna, at front-end of each of the at least two parallel channel amplifying circuits, to thereby reduce a noise coefficient at an output end even without a power splitter, and reduce an area occupied by the radio frequency front-end transceiving apparatus.

8. A power distribution circuit, which is applied to a radio frequency front-end transceiving apparatus, comprising: a common-stage amplifying circuit and a branch-stage amplifying circuit, wherein the branch-stage amplifying circuit comprises at least two parallel channel amplifying circuits;
the common-stage amplifying circuit is configured to perform a first signal processing on a radio frequency signal received by an antenna of the radio frequency front-end transceiving apparatus to obtain a first power signal, and output the first power signal to each of the channel amplifying circuits, respectively, wherein, the first signal processing at least includes a buffering processing, an isolation processing and a low-noise amplifying processing;
each of channel amplifying circuits is configured to perform a second signal processing on the first power signal to obtain a second power signal, and output the second power signal to a radio transceiving device of the radio frequency front-end transceiving apparatus; and
the second signal processing at least includes a low-noise amplifying processing;
wherein the common-stage amplifying circuit comprises a low-noise amplifying circuit structure, which is configured to perform the first signal processing on the radio frequency signal received by the antenna of the radio frequency front-end transceiving apparatus to obtain the first power signal, and output the first power signal to each of the channel amplifying circuits;
wherein the common-stage amplifying circuit further comprises an input impedance matching circuit;
wherein, the input impedance matching circuit is configured to perform an input impedance matching processing on the radio frequency signal received by the antenna of the radio frequency front-end transceiving apparatus to obtain an input impedance matching processed radio frequency signal, and output the input impedance matching processed radio frequency signal to the low-noise amplifying circuit structure; and
correspondingly, the low-noise amplifying circuit structure is configured to perform the first signal processing on the input impedance matching processed radio frequency signal to obtain the first power signal, and output the first power signal to each of the channel amplifying circuits.

9. A power distribution circuit, which is applied to a radio frequency front-end transceiving apparatus, comprising: a common-stage amplifying circuit and a branch-stage amplifying circuit, wherein the branch-stage amplifying circuit comprises at least two parallel channel amplifying circuits;
the common-stage amplifying circuit is configured to perform a first signal processing on a radio frequency signal received by an antenna of the radio frequency front-end transceiving apparatus to obtain a first power signal, and output the first power signal to each of the channel amplifying circuits, respectively, wherein, the first signal processing at least includes a buffering processing, an isolation processing and a low-noise amplifying processing;
each of channel amplifying circuits is configured to perform a second signal processing on the first power signal to obtain a second power signal, and output the second power signal to a radio transceiving device of the radio frequency front-end transceiving apparatus; and
the second signal processing at least includes a low-noise amplifying processing;
wherein the common-stage amplifying circuit comprises a low-noise amplifying circuit structure, which is configured to perform the first signal processing on the radio frequency signal received by the antenna of the radio frequency front-end transceiving apparatus to obtain the first power signal, and output the first power signal to each of the channel amplifying circuits;
wherein the common-stage amplifying circuit further comprises a radio frequency anti-interference circuit;
wherein, the radio frequency anti-interference circuit is connected between an output end of the low-noise amplifying circuit structure and a direct current power supply of the low-noise amplifying circuit structure, and is configured to prevent the radio frequency signal from channeling into the direct current power supply, and protect the common-stage amplifying circuit from being interfered by the radio frequency.

\* \* \* \* \*